United States Patent [19]

Takamiya et al.

[11] Patent Number: 5,483,332
[45] Date of Patent: Jan. 9, 1996

[54] DISPLACEMENT INFORMATION DETECTING APPARATUS AND DOPPLER VELOCIMETER APPARATUS

[75] Inventors: Makoto Takamiya, Tokyo; Jun Ashiwa; Hidejiro Kadowaki, both of Yokohama; Yasuhiko Ishida, Tokyo, all of Japan

[73] Assignee: Canon Kabushiki Kaisha, Tokyo, Japan

[21] Appl. No.: 419,746

[22] Filed: Apr. 10, 1995

Related U.S. Application Data

[63] Continuation of Ser. No. 59,851, May 11, 1993, abandoned.

[30] Foreign Application Priority Data

May 15, 1992 [JP] Japan ................................ 4-123595

[51] Int. Cl.[6] .................................................... G01P 3/36
[52] U.S. Cl. ........................................ 356/28.5; 356/373
[58] Field of Search ................................. 356/28.5, 373

[56] References Cited

U.S. PATENT DOCUMENTS 5,216,478  6/1993  Kadowaki et al. .................... 356/28.5

FOREIGN PATENT DOCUMENTS

0458274  11/1991  European Pat. Off. .
2-262064  10/1990  Japan .

Primary Examiner—Stephen C. Buczinski
Attorney, Agent, or Firm—Fitzpatrick, Cella, Harper & Scinto

[57] ABSTRACT

A doppler velocimeter determines the velocity of an object moving through a beam intersection area by using a doppler frequency obtained by detecting light from the beam intersecting area. The doppler velocimeter includes: a light source; a diffraction grating for diffracting light received from the light source; first and second lens systems for transmitting diffracted light from the diffraction grating to irradiate a portion of a movable object to be examined, the first and second lens systems having the same focal length F; and a detector device for receiving light from the portion of the object irradiated with the light which has been transmitted through the first and second lens systems and for obtaining a doppler signal used for velocity determination. The interval between the first and second lens systems is twice as long as the focal length F. Spherical aberration caused by a portion of the first lens system through which the diffracted light travels is offset by spherical aberration caused by a portion of the second lens system through which the diffracted light travels. This simple construction achieves equidistant interference fringes over the beam intersection area.

30 Claims, 10 Drawing Sheets

ABERRATION

FIG. 10

ABERRATION

DISPLACEMENT INFORMATION DETECTING APPARATUS AND DOPPLER VELOCIMETER APPARATUS

This application is a continuation of application Ser. No. 08/059,851 filed May 11, 1993, now abandoned.

BACKGROUND OF THE INVENTION

1. Field of the Invention

The present invention relates to a displacement information detecting apparatus and a doppler velocimeter apparatus for determining the velocity of a moving object (solid or fluid) without contacting the moving object or fluid. This invention is particularly suitable for a laser doppler velocimeter which determines the velocity of an object by detecting the frequency shift of a laser beam.

2. Description of the Related Art

Laser doppler velocimeters are widely used to precisely determine velocities of moving objects (solid or fluid) without contacting the moving objects or fluids. To determine the velocity of a moving object or fluid, a laser doppler velocimeter emits laser light to the solid or fluid object and detects a Doppler effect, in which the frequency of light scattered from the object shifts in proportion to the velocity of the object.

Figure 1:
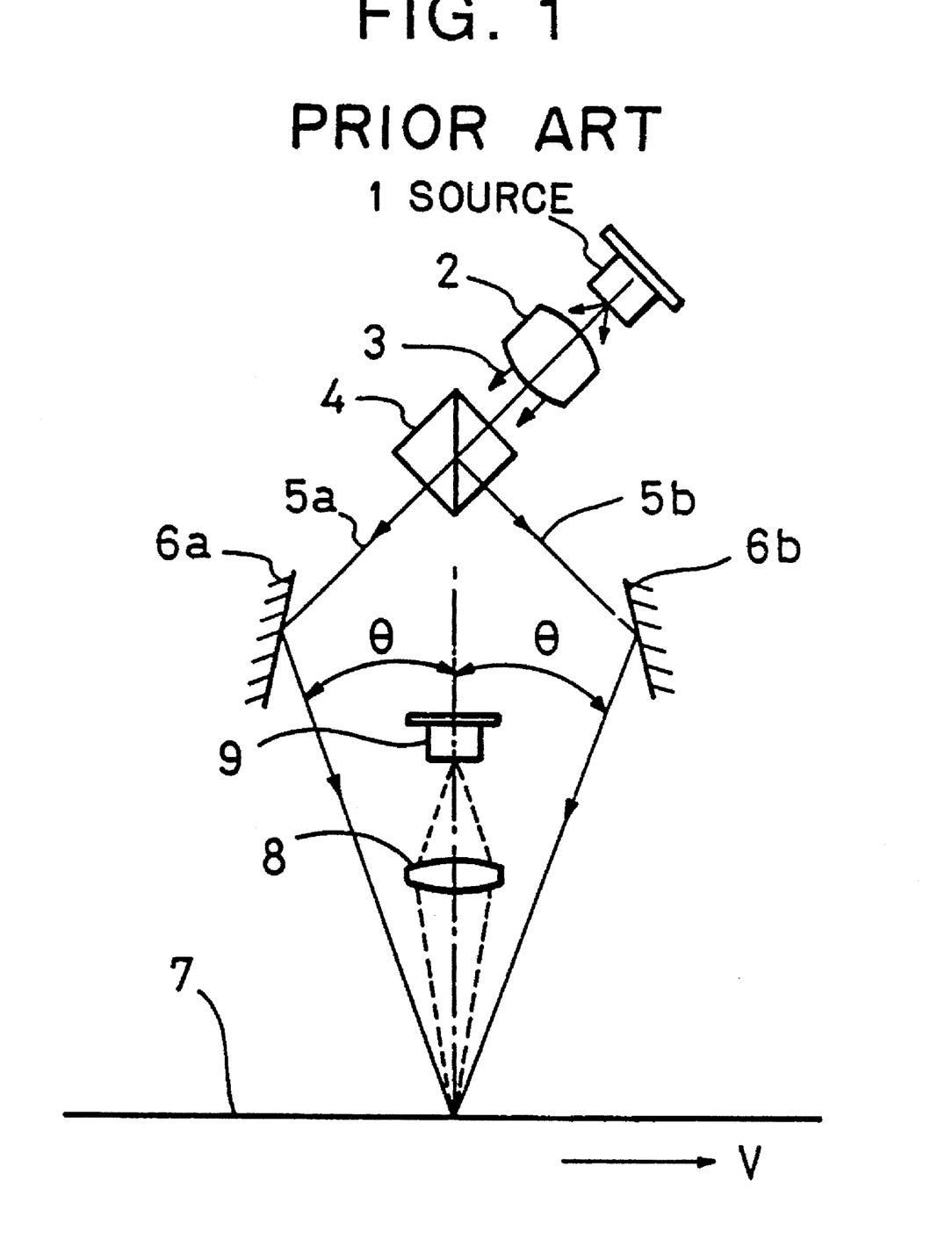
FIG. 1 illustrates a conventional laser doppler velocimeter.

With reference to FIG. 1, a conventional laser doppler velocimeter will be described. Laser light emitted by a laser source 1 is formed into a bundle of parallel rays 3 by a collimator lens 2, split into two bundles 5a and 5b by a beam splitter 4, and reflected by mirrors 6a and 6b, respectively, so that the two ray bundles 5a and 5b are incident on an object 7 moving at a velocity V, at an incidence angle of 9. Light scattered from the object is condensed by a condenser lens 8, and detected by a photodetector 9. The frequencies of the light scattered from the two ray bundles shift by Doppler shifts of +f and −f which are proportional to the velocity V. The Doppler shift f is expressed by the following formula (1):

$$f = V\sin\theta/\lambda \quad (1)$$

where $\lambda$ is the wavelength of the laser light. The scattered rays whose frequencies have been Doppler-shifted by +f or −f interfere with each other so as to cause bright-dark cycles on the light receiving surface of the photodetector 9. The frequency F of the cycles is given by the following formula (2):

$$F = 2f = 2\sin\theta/\lambda \quad (2)$$

Therefore, if the frequency F of the output signal from the photodetector 9 (hereinafter, referred to as the "Doppler frequency F") is determined, the velocity V of the moving object 7 can be obtained on the basis of formula (2).

As formula (2) indicates, the Doppler frequency F detected by the above-described laser doppler velocimeter is in inverse proportion to the wavelength $\lambda$ of the laser light. Therefore, this laser doppler velocimeter must employ a laser source which emits laser light having a constant wavelength. Gas lasers, such as He-Ne lasers, which are able to continuously oscillate and stabilize wavelengths, are widely used in laser doppler velocimeters. However, because the laser oscillators used for gas lasers are bulky and require a high-voltage supply, gas lasers are usually large and expensive. Laser diodes (semiconductor lasers), which are widely used in compact disc players, video disk players, optical fiber communication apparatuses or the like, are very small and can be easily driven, but the wavelength of laser diodes significantly vary depending on temperature.

Figure 2:
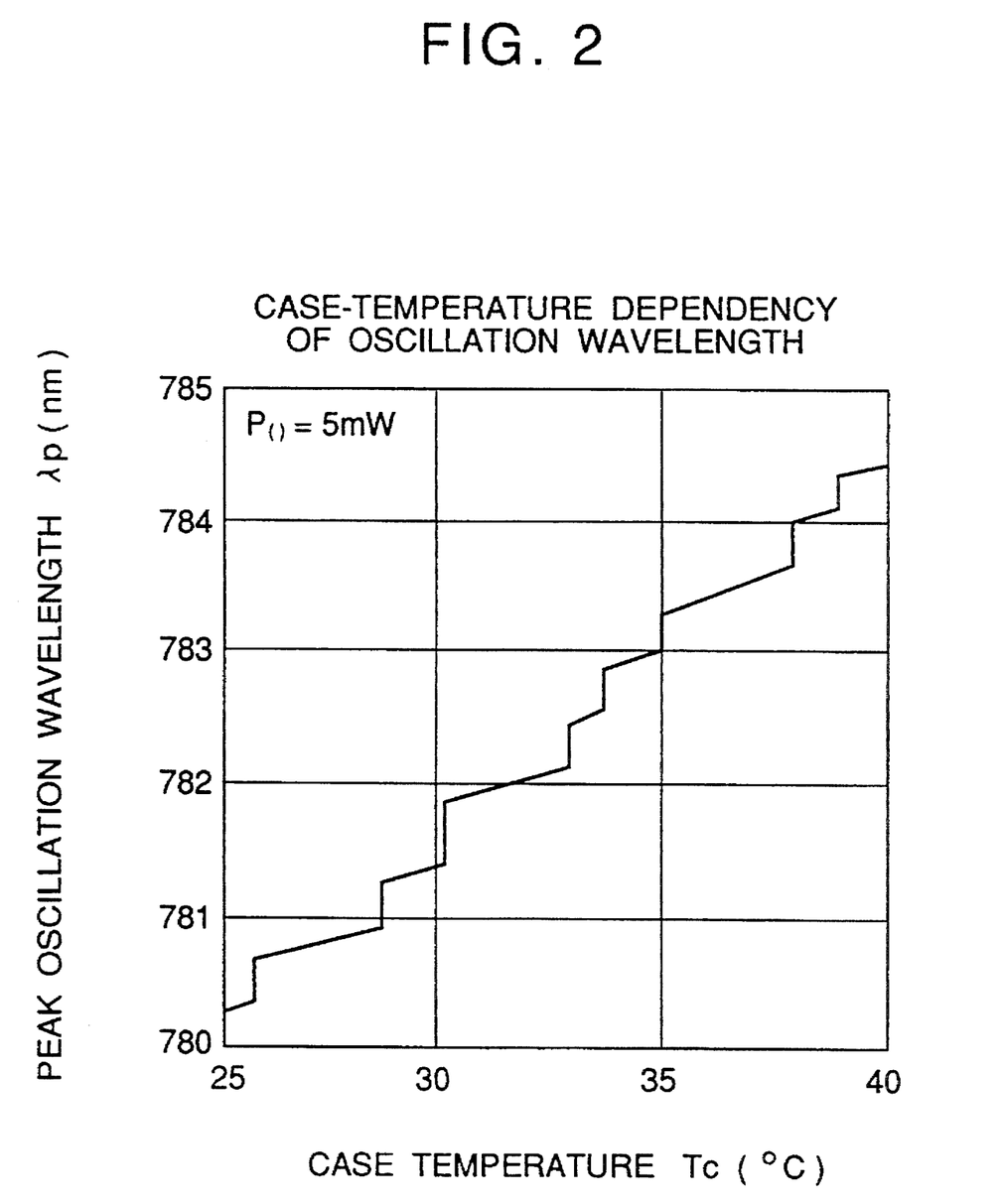
FIG. 2 is a graph indicating an example of the temperature dependency of the oscillation wavelength of a laser diode.

FIG. 2 indicates an example of normal temperature dependency of a laser diode (adopted from Mitsubishi Semiconductor Handbook (1987), vol. "Optical Semiconductor Device"). During continuous changes, the wavelength varies at a rate of 0.05–0.06 nm/° C., depending mainly on temperature-dependent changes in refractivity of the active layer of the laser diode. During discontinuous changes, which are called "longitudinal mode hopping", the wavelength discontinuously varies at a rate of 0.2–0.3 nm/° C.

In a usual method for stabilizing the wavelength, a laser diode is maintained at a constant temperature. However, in this method, the temperature must be precisely controlled by using various temperature controlling members, such as a heater, a radiator and a temperature sensor, which are attached to the laser diode so as to have only small thermal resistances. Therefore, employment of this method increases the size and cost of the laser doppler velocimeter. Further, this method cannot completely eliminate wavelength instability caused by the above-mentioned longitudinal mode hopping.

To eliminate the above-described problems, Japanese Patent Application Laid-open No. 2-262064 proposes a laser doppler velocimeter employing a diffraction grating. In this velocimeter, laser light emitted from a laser strikes a diffraction grating, and the two ray bundles of the orders +n and −n (n= 1, 2, 3, . . . ) of the diffracted light (excluding the ray bundle of zero order) are directed so as to strike a moving object or fluid at intersecting angles equal to the angle between the two bundles of rays. Then, the photodetector of the velocimeter detects light scattered from the object or fluid.

Figure 3:
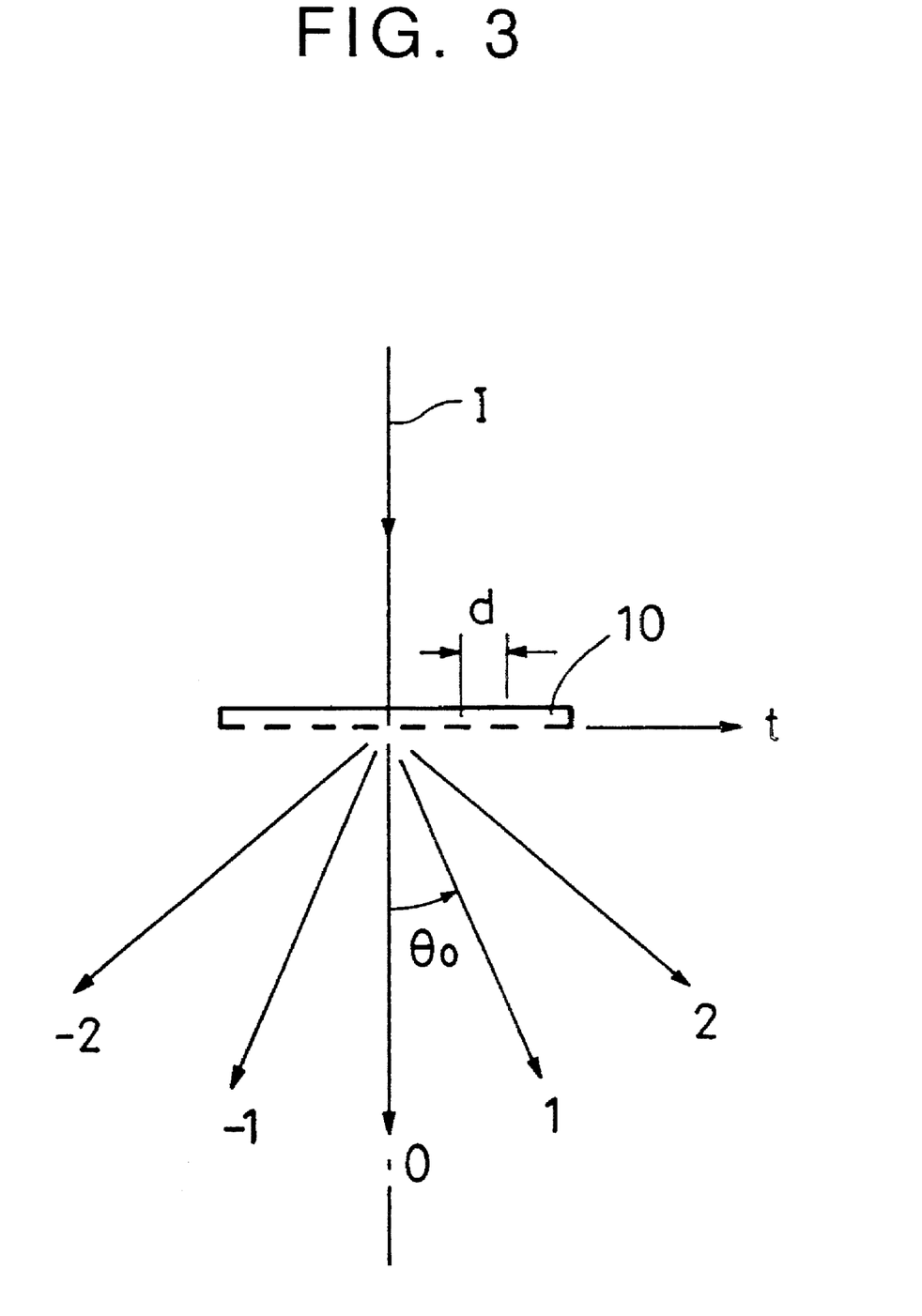
FIG. 3 illustrates a diffraction grating.

FIG. 3 illustrates an example of diffraction where laser light I is incident on a transmission diffraction grating 10 having a grating pitch of d, perpendicularly to the direction t in which the grating lines are arranged. The diffraction angle $\theta_0$ is given by the following formula:

$$\sin\theta_0 = m\lambda/d$$

where m is a diffraction order (0, 1, 2, . . . ), and $\lambda$ is the wavelength of the light. The ray bundles of the order in except the order zero are expressed by the following formula:

$$\sin\theta_0 = \pm n\lambda/d \quad (3)$$

where n is a natural number (1, 2, . . . ).

Figure 4:
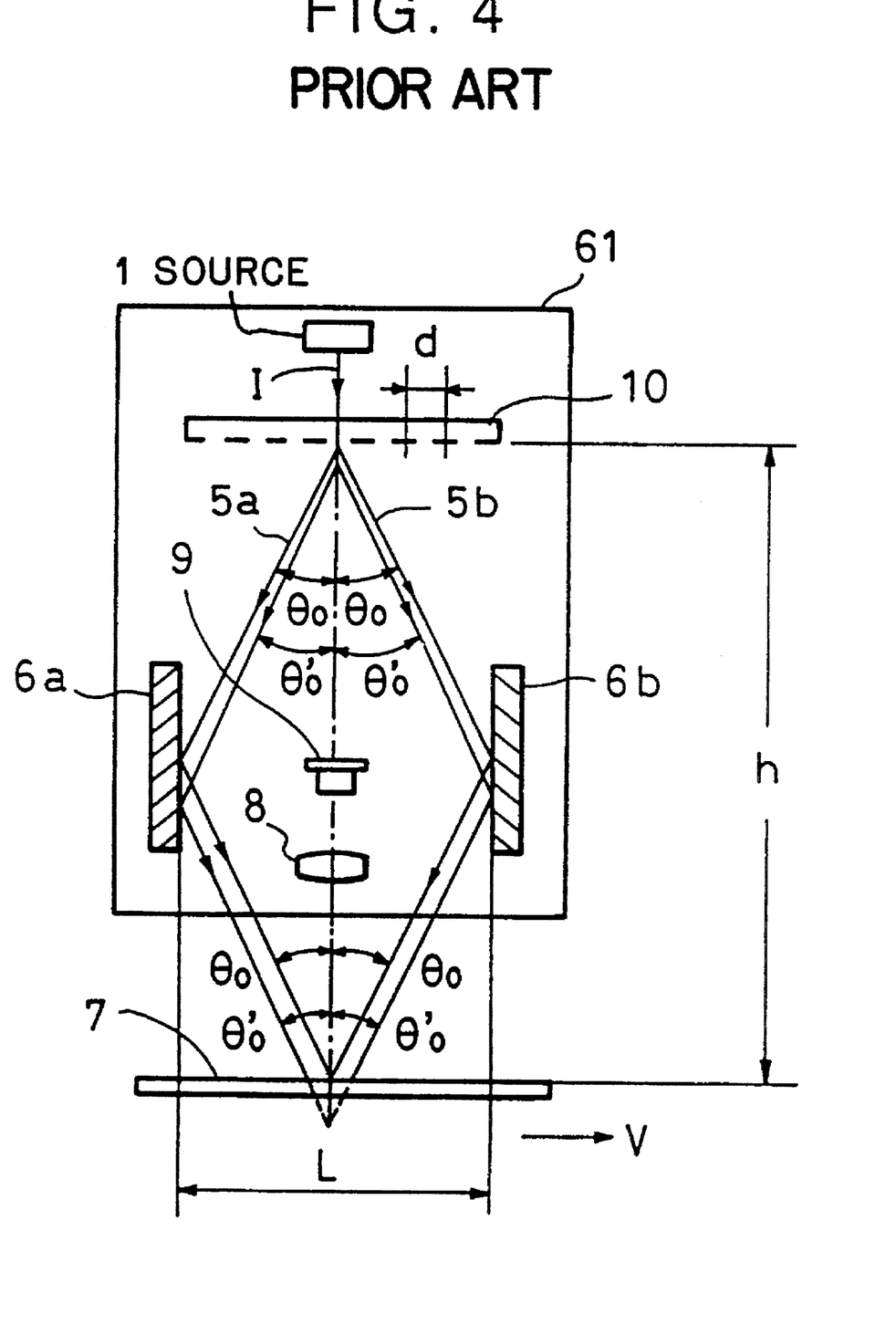
FIG. 4 illustrates a laser doppler velocimeter employing a diffraction grating.

FIG. 4 illustrates the ray bundles of the order ±n which are reflected by mirrors 6a and 6b so as to strike an object 7 at incident angles equal to $\theta_0$. Numeral 61 denotes a main body of this apparatus. By using the formulas (2) and (3), the Doppler frequency F detected by a photodetector 9 is obtained as:

$$F = 2V\sin\theta_0/\lambda = 2nV/d \quad (4)$$

Thus, the Doppler frequency F is independent from the wavelength $\lambda$ of the laser light I, in inverse proportion to the grating pitch d of the diffraction grating 10, and in proportion to the velocity V of the determination object 7. Since the grating pitch d can be made substantially constant, a Doppler frequency F detected by the photodetector 9, practically speaking, is simply in proportion to the velocity of the determination object 7. The diffraction grating 10 may be of a reflection type instead of a transmission type, achieving substantially the same effects.

The present inventors have proposed in published European Patent Application No. 0458274 a laser doppler velocimeter as described above having an optical system in which the incidence angle θ of laser light striking a moving solid or fluid object varies in accordance with changes in the wavelength of the laser light so that sinθ/λ remains substantially constant, the optical system includes a diffraction grating for diffracting the laser light so as to form diffracted ray bundles of the orders ±n (n= 1, 2, 3, ... ) and two lenses which have the same focal lengths and are arranged apart from each other by an interval twice the focal length F. As used in this specification, an interval between lenses or lens groups is defined as a distance between an image field-main plane (that is, the main plane closer to the image field) of a lens (or a lens group) closer to the object and the object-side main plane of a lens (or a lens group) closer to the image field, and an interval between a lens (or a lens group) and an object other than a lens, such as an object or an optical component other than lens, is defined as a distance between the object and the object-side main plane of the lens (or a lens group). The thus-constructed laser doppler velocimeter is able to prevent deviation of the two intersecting ray bundles despite a change in the wavelength of the laser light. Further, the laser doppler velocimeter achieves an increased working distance and, thereby, good operability by setting the interval between the diffraction grating and the neighboring lens to a distance which is shorter than the focal length.

Figure 5:
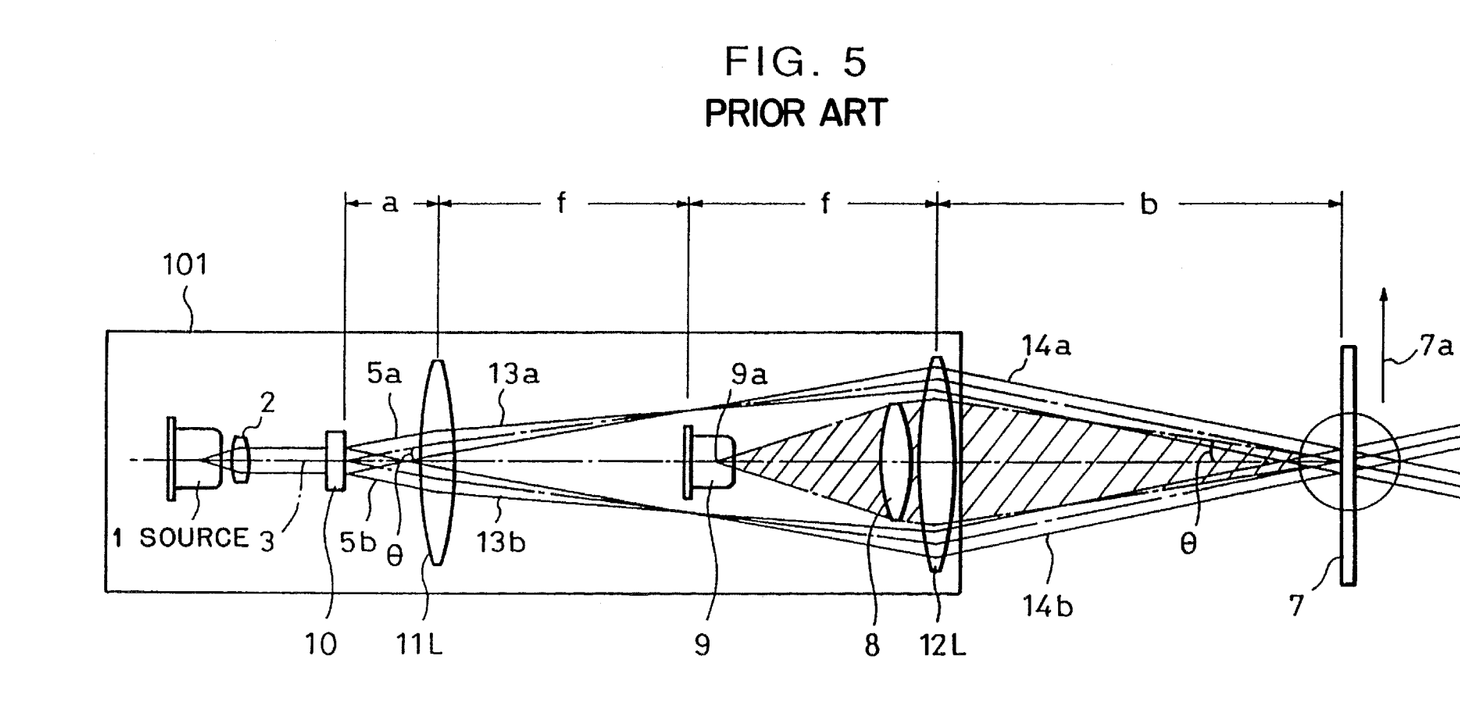
FIG. 5 schematically illustrates essential portions of an optical system of a laser doppler velocimeter previously disclosed by the present inventors.

FIG. 5 schematically illustrates essential portions of an optical system of a laser doppler velocimeter employing a diffraction grating. FIG. 5 shows an object 7 whose velocity is to be determined, and a ! laser doppler velocimeter 101 comprising: a laser diode 1, a collimator lens 2, a diffraction grating 10, and convex lenses 11L, 12L (illustrated as thin lenses in the figure) having a focal length of f, the foregoing members being arranged as shown in the figure. The distances a and b satisfy the formula, a+b=2f.

The laser diode 1 emits laser light having a wavelength of about 0.68 μm, which is formed into a parallel ray bundle 3 having a diameter of 1.2 by the collimator lens 2. The parallel ray bundle 3 perpendicularly strikes the transmission diffraction grating having a grating pitch of 3.2 μm. As a result, diffraction ray bundles of the orders ±1 go out therefrom at diffraction angles θ= 12°. The ray bundles 5a and 5b enter the convex lens 11L with the focal length f and come out as ray bundles 13a and 13b. Then, the bundles 13a and 13b enter the other convex lens 12L placed 2f apart from the convex lens 11L and come out as parallel ray bundles 14a and 14b, which strike the object 7 at incidence angles equal to the diffraction angle θ= 12° so as to form a light spot having a diameter of 1.2 mm on the surface of the object 7. Laser light scattered from the object 7 is effectively converged by a combination of the convex lens 12L and a condenser lens 8 onto the photoreceptor portion of a photodetector 9, which then detects light signals including a Doppler signal expressed by the following formula (5):

$$F=2V/d \qquad (5)$$

If the wavelength λ laser light emitted by the laser diode 1 varies, the diffraction angle θ varies. However, similar to the velocimeter described above, such variation of the wavelength λ or diffraction angle θ does not affect the Doppler signal F. This laser doppler velocimeter is able to fix the position of the spot formed on an object by the two ray bundles. If the position of the laser doppler velocimeter 101 relative to the object 7 is set as shown in FIG. 5, the spot formed on the object 7 by the two ray bundles 14a and 14b remains in the same position relative to the laser doppler velocimeter 101. Therefore, the two ray bundles 14a and 14b constantly coincide on the object 7 and never form two spots that deviate from each other.

Further, since a< b, that is, the distance b is relatively long, a long working distance is achieved, thus substantially increasing freedom when installing the velocimeter.

To achieve high performance of the above-described laser doppler velocimeter, the interference fringes formed at the intersection of the two ray bundles must be constantly stable in any depth at which determination is performed, despite changes in the wavelength of the laser light.

Figure 6:
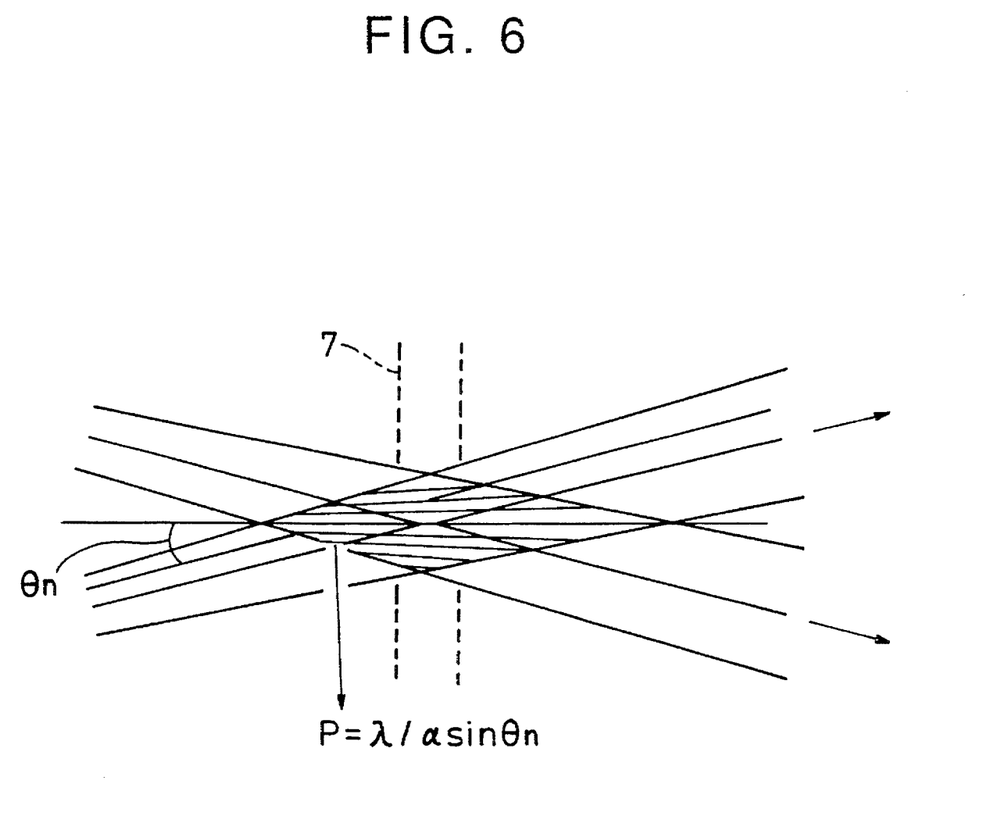
FIG. 6 illustrates the collimation (parallelization) of laser light.

Collimation (parallelization) of laser light will now be described. FIG. 6 shows an enlarged view of the intersection of the two ray bundles (encircled in FIG. 5). If the collimation of the laser light is poor due to, for example, aberration of the collimating optical system and, therefore, the ray bundles diverge to some extent, the interference fringes have different intervals at locations closer to and farther from the laser doppler velocimeter. Therefore, even if objects move through the ray bundle-intersecting space at the same velocity, the resulting velocity determinations vary depending on how far the course of a moving object through the space is from the laser doppler velocimeter. More specifically, the doppler frequency with respect to an object moving at a constant velocity varies depending on determination depths. The same problem is caused if the ray bundles converge.

The interference fringe interval p is written as:

$$p=\lambda/\sin(\theta n) \qquad (6)$$

where θn is half the angle between the two ray bundles.

The wavelength λ is written by using the diffraction angle $\theta_0$ with respect to the diffraction grating having a grating pitch d as follows:

$$d\sin(\theta_0)=\lambda \qquad (7)$$

If there is an angle deviation θ' from the diffraction angle $\theta_0$ of each ray of the ray bundles, the angle deviation θ' being a parameter indicating an error in the collimation of the ray bundles, then θn=$\theta_0$+θ' ($\theta_0$ is the diffraction angle and becomes equal to the angle θn if there is no angle deviation). Thus, the interference fringe interval can be expressed as follows:

$$p=\lambda/2\sin(\theta_0+\theta') \qquad (8)$$

If the ray bundles are perfectly collimated, that is, θn= $\theta_0$, then the interference fringes have a desirable interference fringe interval p, which can be written on the basis of the formulas (6) and (7) as follows:

$$p=d/2 \qquad (9)$$

If absolute precision of + 0.2 % is required, that is, a value p obtained on the basis of the formula (8) is allowed to deviate from a value p obtained on the basis of the formula (9) by ± 0.2% or less, then the angle deviation θ' must be about 1 minute or less.

SUMMARY OF THE INVENTION

The present invention is intended to improve the above-described known art. An object of the present invention is to provide and achieve high precision in laser doppler velocity determination by using a relatively simple optical system constructed by, for example, a combination of spherical lenses.

A doppler velocimeter apparatus according to one embodiment of the present invention includes a light source for producing a light beam; a diffraction grating for diffracting light received from the light source; first and second lens systems for transmitting diffracted light from the diffraction grating to irradiate a detection area of a movable object from which a doppler signal is obtained, the first and second lens systems having the same focal length F; and detection means for receiving light from the detection area irradiated with the light which has been transmitted through the first and second lens systems and for obtaining a doppler signal to determine velocity of the detection area, wherein the first and second lens system are arranged so that an interval between the first and second lens systems is twice as long as the focal length F, and so that an interval between the diffraction grating and the first lens system is shorter than an interval between the second lens system and the irradiated detection area, and so that the spherical aberration caused by a portion of the first lens system through which the diffracted light travels is offset by the spherical aberration caused by a portion of the second lens system through which the diffracted light travels. The detection means can comprise a light receiving device.

Another doppler velocimeter apparatus according to an embodiment of the present invention includes a light source for producing a light beam; a diffraction grating for diffracting light received from the light source; a lens system for transmitting diffracted light from the diffraction grating to irradiate a detection area of a movable object from which a doppler signal is obtained, the lens system comprising (i) a biconvex lens and (ii) a plane-convex lens group including two plane-convex lenses having respective convex surfaces of which facing each other; and detection means for receiving light from the detection area irradiated with the light which has been transmitted through the lens system and for obtaining a doppler signal to determine velocity of the detection area, wherein the biconvex lens and the plane-convex lens group have the same focal length F, an interval between the biconvex lens and the plane-convex lens group is twice as long as the focal length F, and wherein an interval between the diffraction grating and the biconvex lens is shorter than an interval between the plane-convex lens group and the detection area. The detection means can comprise a light receiving device.

A displacement information detecting apparatus according to an embodiment of the present invention includes a light source for producing light; a diffraction grating for diffracting light received from the light source; first and second lens systems for transmitting diffracted light from the diffraction grating to irradiate a detection area of a movable object from which displacement-information is obtained, the first and second lens systems having the same focal length F; and detection means for receiving light from the detection area irradiated with the light which has been transmitted through the first and second lens systems and for obtaining information related to displacement of the detection area, wherein the first and second lens systems are arranged so that an interval between the first and second lens systems is twice as long as the focal length F, and so that an interval between the diffraction grating and a first lens system is shorter than the interval between the second lens system and the detection area, and so that spherical aberration caused by a portion of the first lens system through which the diffracted light travels is offset by spherical aberration caused by a portion of the second lens system through which the diffracted light travels. The detection means can comprise a light receiving device.

According to another aspect, the present invention relates to a doppler velocimeter apparatus that includes a light source for producing a bundle of light rays, a ray bundle splitter device for splitting the bundle of rays received from the light source, a lens system for transmitting a split ray bundle from the ray bundle splitter device to irradiate a portion of a movable object to be examined and a light receiving device for receiving light from the portion of the object irradiated with split ray bundle which has been transmitted through the lens system and for producing a doppler signal that includes information related velocity of the irradiated portion of the object. The lens system includes (1) a biconvex lens and (2) a plane-convex lens group including two plane-convex lenses having respective convex surfaces which face each other, the biconvex lens and the plane-convex lens group having the same focal length F and being spaced apart from each other along an optical axis of the lens system by an interval twice the focal length F, and being arranged so that an interval between the ray bundle splitter device and the biconvex lens is shorter than an interval between the plane-convex lens group and the irradiated portion.

According to another aspect, the present invention relates to a displacement information detecting apparatus that includes a light source for producing light, a ray bundle splitter device for splitting light received from the light source into a split ray bundle, a first lens system and a second lens system for transmitting a split ray bundle from the ray bundle splitter device to irradiate a portion of a movable object to be examined and a light receiving device for receiving light from the portion of the object irradiated with the split ray bundle which has been transmitted through the first lens system and the second lens system and for producing information related to displacement of the irradiated portion of the object. The first lens system and the second lens system have the same focal length F and are spaced apart from each other along an optical axis of the lens systems by an interval twice the focal length F, and are arranged so that an interval between the ray bundle splitter device and the first lens system is different from an interval between the second lens system and the irradiated portion, and so that spherical aberration caused by a portion of the first lens through which the split ray bundle from the ray bundle splitter device travels is offset by spherical aberration caused by a portion of the second lens system through which the split ray bundle from the first lens system travels.

According to yet another aspect, the present invention relates to a displacement information detecting apparatus that includes a light source for producing light, a ray bundle splitter device for splitting light received from the light source into a split ray bundle in a direction which changes depending on the wavelength of the light from the light source, a first lens system and a second lens system for transmitting the split ray bundle from the ray bundle splitter device to irradiate a portion of a movable object to be examined and a light receiving device for receiving light from the portion of the object irradiated with the split ray bundle which has been transmitted through the first lens system and the second lens system and for producing information related to displacement of the irradiated portion of the object. The first lens system and the second lens system have the same focal length F and are spaced apart from each other along an optical axis of the lens systems by an interval twice the focal length F and are arranged so that an interval between the ray bundle splitter device and the first lens system is different from an interval between the second lens system and the irradiated portion, and so that spherical aberration caused by a portion of the first lens through which the split ray bundle from the ray bundle splitter device travels and spherical aberration caused by a portion of the second lens system through which the split ray bundle from the first lens system travels remains unchanged despite wavelength fluctuation in the light from the light source.

Further objects, features and advantages of the present invention will become apparent from the following description of the preferred embodiments with reference to the attached drawings.

BRIEF DESCRIPTION OF THE DRAWINGS

Like reference numerals have been used for like or similar elements throughout the views.

DESCRIPTION OF THE PREFERRED EMBODIMENT

The preferred embodiment of the present invention will be described hereinafter with reference to the attached drawings.

Figure 7:
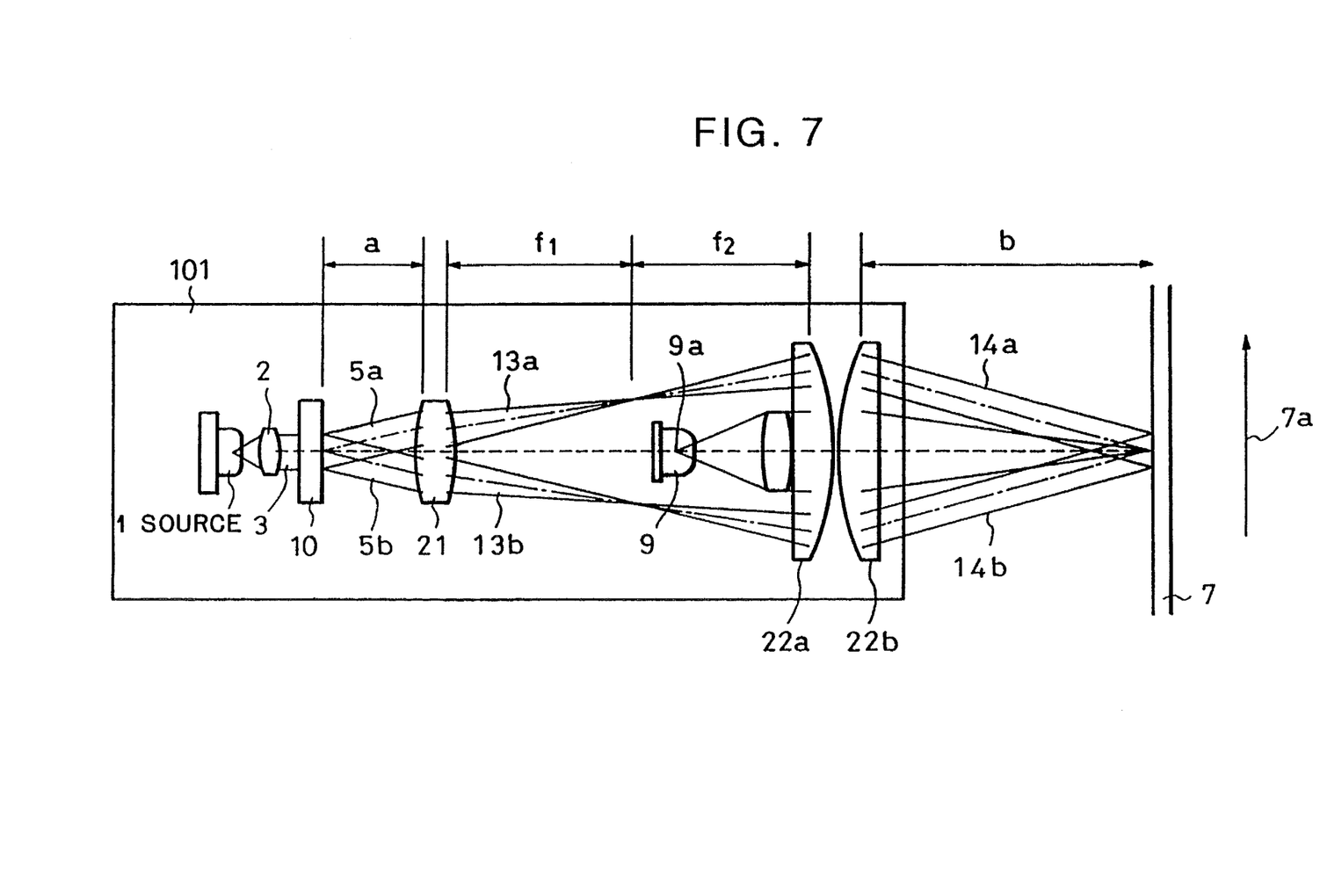
FIG. 7 illustrates a Doppler velocimeter according to an embodiment of the present invention.

FIG. 7 illustrates the construction of an optical system of a laser doppler velocimeter according to an embodiment of the present invention. A laser diode 1 emits a laser ray bundle 3, which is then precisely collimated by a collimator lens 2. A biconvex lens 21 has a radius of curvature of 15.57 mm and a thickness of 3.6 mm. Plane-convex lenses 22a and 22b each have a curvature radius of 15.57 mm and a thickness of 5.6 mm and constitute a plane-lens group. Each of the focal lengths $f_1$, $f_2$ of the biconvex lens 21 and the plane-convex lens group composed of the lenses 22a and 22b is about 15 mm. Members comparable to those shown in FIG. 5 are denoted by the same numerals. The distance a is set to about 10 mm, thus enabling a substantially long working distance b, which is about 20 mm. In this specification, the base points for measuring the distances of the lenses and lens groups are present on a main plane.

As shown in FIG. 7, in an arrangement where the first lens group (the biconvex lens 21) and the second lens group (the plane-convex lenses 22a and 22b) have the same focal length (i.e., $f_1 = f_2$) and are arranged at a distance twice the focal length thereof from each other, and when the distance a is relatively short and the distance b is relatively long, the position of incidence of the ray bundles on the second lens group is considerably farther from the optical axis than the positions of incidence thereof on the first lens group.

Figure 9:
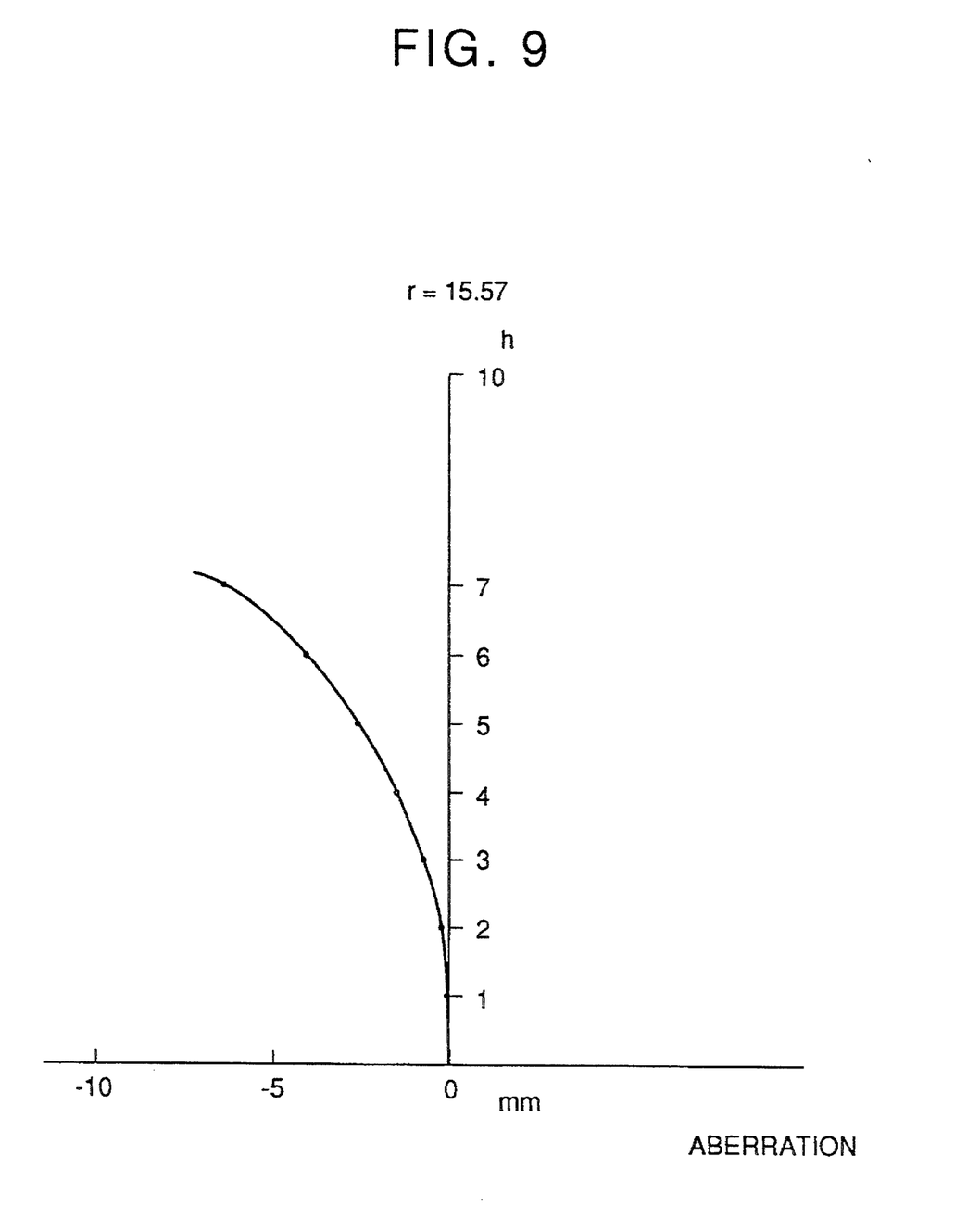
FIG. 9 shows an example aberration curve of a biconvex lens.

FIG. 9 is a graph showing a representative aberration curve of a biconvex lens having a curvature radius of 15.57 mm. As the graph indicates, the gradient of the aberration (spherical aberration) curve increases as the distance from the optical axis of the biconvex lens is increased. Suppose that both the first and second lens groups were comprised of biconvex lenses. Then, the aberration of the second lens group would significantly affect the ray bundles passing through it because the incidence positions on the second lens group are substantially apart from the optical axis. Thus, the rays coming out of the second lens group would substantially lose collimation.

Figure 10:
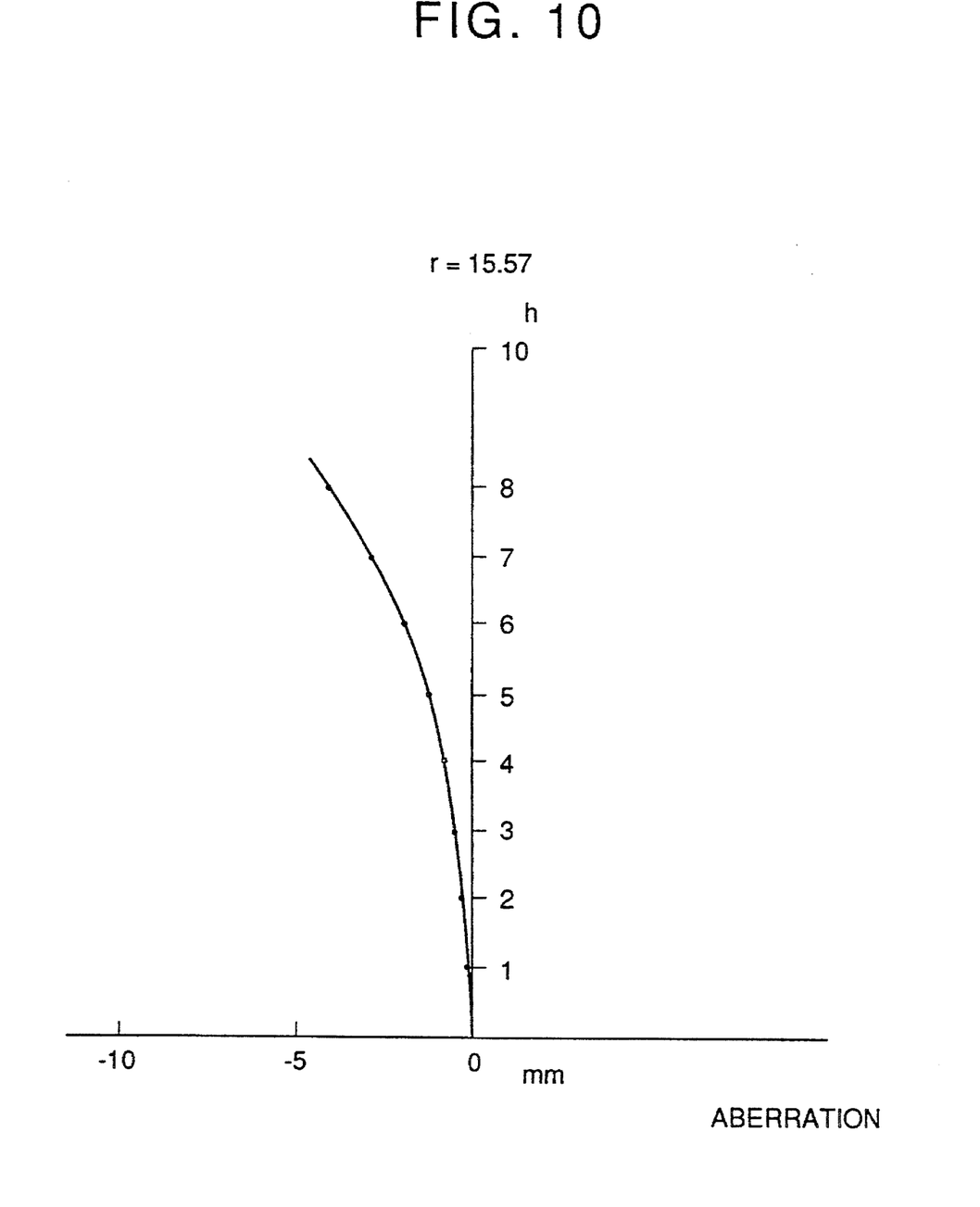
FIG. 10 shows an example aberration curve of a plane-convex lens group.

FIG. 10 is a graph showing a representative aberration curve of a lens group composed of two plane-convex lenses each having a curvature radius of 15.57 mm. As the graph indicates, the gradient of the aberration curve of the thus-constructed plane-convex lens group increases less drastically than the gradient of the aberration curve of the biconvex lens, as the distance from the optical axis is increased. Moreover, the gradient of the aberration curve of the plane-convex lens group at a relatively long distance from the optical axis is approximately equal to the gradient of the aberration curve of the biconvex lens at a relatively short distance from the optical axis.

Figure 8:
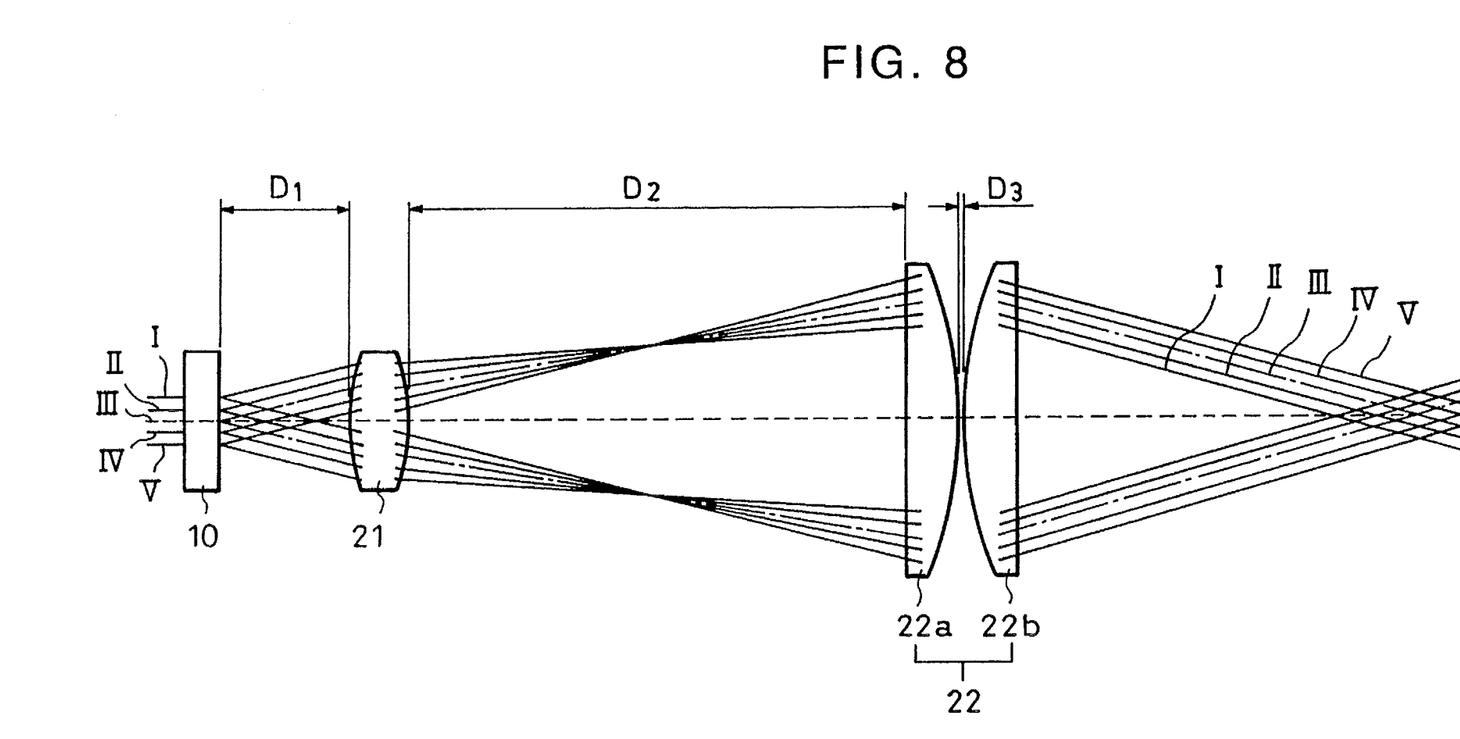
FIG. 8 illustrates the optical system of the doppler velocimeter shown in FIG. 7.

As described above, in this optical system, the first lens group is comprised of the biconvex lens 21 and positioned so that the ray bundles fall on portions of the first lens group relatively close to the optical axis, and the second lens group is comprised of two plane-convex lenses 22a and 22b and positioned so that the ray bundles fall on portions of the second lens group relatively far from the optical axis. The ray bundles coming out of the biconvex lens 21 converge and then diverge, so that spherical aberrations caused by the biconvex lens 21 are reversed (more specifically, the gradients of the aberration at cross sections of the ray bundles are reversed with respect the optical axis), before they reach the plane-convex lens group 22 (FIG. 8). The portions of the plane-convex lens group on which the ray bundles fall have approximately, or exactly, the same aberration gradients as the portions of the biconvex lens on which the ray bundles fall. Therefore, the aberration gradients in the ray bundles caused by biconvex lens 21 are reversed by the convergence and, therefore, reduced to approximately, or exactly, zero with respect to the directions perpendicular to the optical axis when the ray bundles pass through the plane-convex lens group 22. In short, the spherical aberration caused by the biconvex lens 21 is corrected by the plane-convex lens group 22. The ray bundles have been thus highly collimated when they intersect at the object 7. As a result, the interference fringes created in the intersection portion become equidistant in any location, thus enabling high-precision determination of the velocity of an object regardless of the course of the object through the intersection portion.

As described above, the optical system should preferably be constructed so that the aberration gradient of the incidence portions of the first lens group (the biconvex lens 21) is equivalent to the aberration gradient of the incidence portions of the second lens group (the plane-convex lens group 22), in order that the spherical aberration caused by the first lens group is corrected by the second lens group. In an optical system in which the distance a is shorter than the working distance b, such correction of aberration can be substantially achieved simply by employing a first lens group comprised of a biconvex lens and a second lens group comprised of plane-convex lenses whose convex surfaces face each other.

FIG. 8 illustrates in detail the optical system shown in FIG. 7, further showing: sizes of the gaps D1, D2 and D3 between the optical components (that is, the beam splitter and the lenses); and rays I, II, III, IV and V which are perpendicular to the diffraction grating having a grating pitch of 3.2 μm and present at +0.6 mm, +0.3 mm, 0, −0.3 mm, and −0.6 mm, respectively, according to an X-axis. The gap sizes D1, D2 and D3 are shown in Table 1.

TABLE 1

| D1 = | D2 = | D3 = |
|---|---|---|
| 8.3 mm | 24.375 mm | 0.5 mm |

Excellent correction of spherical aberration achieved by the optical system will be described hereinafter.

Table 2 shows results of tracing the rays I, II, III, IV and V when the laser wavelength is 685 nm, 675 nm and 695 nm. The values shown are angle deviations θ' (in the unit of minutes) of each ray from the diffraction angle $θ_0$ measured at the intersection portion of which the two ray bundles intersect (that is, in the vicinity of the object).

TABLE 2

| Wavelength (nm) | Ray I | Ray II | Ray III | Ray IV | Ray V |
|---|---|---|---|---|---|
| 675 | 0.481 | 0.367 | −0.065 | −0.450 | −0.440 |
| 685 | 0.181 | 0.246 | 0.024 | −0.174 | 0.022 |
| 695 | −0.127 | 0.157 | 0.112 | 0.105 | 0.489 |

As shown in Table 2, when the laser wavelength was 685 nm, all the angle deviations θ' were within the range of + 1 minute. This proves that when at the intersection of the two ray bundles, the rays were substantially parallel and, therefore, the interference fringe intervals were consistent over all the determination depths. In other words, the aberrations of the biconvex lens and the plane-convex lens group offset each other.

Further, the diffraction angles θ' were also substantially small when the laser wavelength is deviated by ± 10 nm from 685 nm. This indicates that if the wavelength varies due to, for example, a temperature change, the interference fringes are not significantly disturbed.

According to the above embodiment, the size of an optical system can be proportionally increased or reduced (more specifically, the radii of curvatures and thicknesses of the lenses and the gap sizes between the optical components can be proportionally increased or reduced) without changing the angle deviation characteristics as shown in Table 2, as long as the grating pitch is 3.2 μm and a laser wavelength is about 675 nm.

If either the grating pitch or the laser wavelength is changed, the paths of the ray bundles through the optical system will change. In such a case, the optimal angle deviation characteristic as shown in Table 2 can be achieved by adjusting the thicknesses and curvature radii of the lenses and the gap sizes between the optical components.

A highly precise and easily operable laser doppler velocimeter can be achieved by using the above-described simple optical system comprised of spherical lenses.

Except as otherwise disclosed herein, the various components shown in outline or block form in the Figures are individually well known in the displacement and velocity detecting arts, and their internal construction and operation are not critical either to the making or using of this invention or to a description of the best mode of the invention.

While the present invention has been described with reference to what are presently considered to be the preferred embodiments, it is to be understood that the invention is not limited to disclosed embodiments. To the contrary, the invention is intended to cover various modifications and equivalent arrangements included within the spirit and scope of the appended claims.

What is claimed is:

1. A displacement information detecting apparatus comprising:

a light source for producing light;

a diffraction grating for diffracting light received from said light source;

a first lens system and a second lens system for transmitting the diffracted light from said diffraction grating to irradiate a portion of a movable object to be examined, said first lens system and said second lens system having the same focal length F and being spaced apart from each other along an optical axis of said lens systems by an interval twice the focal length F, and being arranged so that an interval between said diffraction grating and said first lens system is different from an interval between said second lens system and the irradiated portion, and so that spherical aberration caused by a portion of said first lens system through which the diffracted light from said diffraction grating travels is substantially offset by spherical aberration caused by a portion of said second lens system through which the diffracted light from said first lens system travels; and a light receiving device for receiving light from the portion of the object irradiated with the diffracted light which has been transmitted through said first lens system and said second lens system, and for producing information related to displacement of the irradiated portion of the object.

2. A displacement information detecting apparatus according to claim 1, wherein said diffraction grating forms two diffracted ray bundles of orders of ± n (n being a natural number) which bundles are detected by said first lens system, and wherein said second lens system deflects the diffracted ray bundles from said first lens system so that the two ray bundles intersect each other on the irradiated portion.

3. A displacement information detecting apparatus according to claim 1, wherein said first lens system comprises a biconvex lens, and said second lens system comprises two plane-convex lenses having respective convex surfaces of which face each other.

4. A displacement information detecting apparatus according to claim 1, wherein said light source comprises means for producing substantially parallel rays, which are received by said diffraction grating.

5. A displacement information detecting apparatus according to claim 1, wherein said first lens system converges the diffracted light before said second lens system.

6. A displacement information detecting apparatus according to claim 1, wherein said light receiving device receives light from the irradiated portion via said second lens system.

7. A displacement information detecting apparatus according to claim 1, wherein said light source comprises a semiconductor laser.

8. A displacement information detecting apparatus according to claim 1, wherein said light receiving device produces information related to velocity of the irradiated portion of the object.

9. A doppler velocimeter apparatus comprising:

a light source for producing a light beam;

a diffraction grating for diffracting light received from said light source;

a lens system for transmitting diffracted light from said diffraction grating to irradiate a portion of a movable object to be examined, said lens system comprising (i) a biconvex lens and (ii) a plane-convex lens group including two plane-convex lenses having respective convex surfaces which face each other, said biconvex lens and said plane-convex lens group having the same focal length F and being spaced apart from each other along an optical axis of said lens system by an interval twice the focal length F, and being arranged so that an interval between said diffraction grating and said biconvex lens is shorter than an interval between said plane-convex lens group and the irradiated portion; and a light receiving device for receiving light from the portion of the object irradiated with the diffracted light which has been transmitted through said lens system, and for producing a doppler signal that includes information related to velocity of the irradiated portion of the object.

10. A doppler velocimeter apparatus according to claim 9, wherein said diffraction grating forms two diffracted ray bundles of the orders of ± n (n being a natural number), which bundles are deflected by said biconvex lens, and wherein said plane-convex lens group deflects the diffracted ray bundles from said biconvex lens so that the two ray bundles intersect each other on the irradiated portion.

11. A doppler velocimeter apparatus according to claim 9, wherein said light source comprises means for producing substantially parallel rays, which are received by said diffraction grating.

12. A doppler velocimeter apparatus according to claim 9, wherein said light receiving device receives light from the irradiated portion through said plane-convex lens group.

13. A doppler velocimeter apparatus according to claim 9, wherein said light source comprises a semiconductor laser.

14. A doppler velocimeter apparatus according to claim 9, wherein the radius of curvature of said biconvex lens is substantially the same as the radius of curvature of each of said two plane-convex lenses of said plane-convex lens group.

15. A doppler velocimeter apparatus comprising:

a light source for producing light;

a diffraction grating for diffracting light received from said light source;

a first lens system and a second lens system for transmitting diffracted light from said diffraction grating to irradiate a portion of a movable object to be examined, said first lens system and said second lens system having the same focal length F and being spaced apart from each other along an optical axis of said lens systems by an interval twice the focal length F, and being arranged so that an interval between said diffraction grating and said first lens system is shorter than an interval between said second lens system and the irradiated portion, and so that spherical aberration caused by a portion of said first lens through which the diffracted light from said diffraction grating travels is substantially offset by spherical aberration caused by a portion of said second lens system through which the diffracted light from said first lens system travels; and a light receiving device for receiving light from the portion of the object irradiated with the diffracted light which has been transmitted through said first lens system and said second lens system, and for producing a doppler signal that includes information related to the velocity of the irradiated portion of the object.

16. A doppler velocimeter apparatus according to claim 15, wherein said light source comprises means for producing substantially parallel rays, which are received by said diffraction grating.

17. A doppler velocimeter apparatus according to claim 15, wherein said light source comprises a semiconductor laser.

18. A doppler velocimeter apparatus according to claim 15, wherein said light receiving device receives light from said portion to be examined via said second lens system.

19. A doppler velocimeter apparatus comprising:

a light source for producing a bundle of light rays;

a ray bundle splitter device for splitting the bundle of rays received from said light source;

a lens system for transmitting a split ray bundle from said ray bundle splitter device to irradiate a portion of a movable object to be examined, said lens system comprising (i) a biconvex lens and (ii) a plane-convex lens group including two plane-convex lenses having respective convex surfaces which face each other, said biconvex lens and said plane-convex lens group having the same focal length F and being spaced apart from each other along an optical axis of said lens system by an interval twice the focal length F, and being arranged so that an interval between said ray bundle splitter device and said biconvex lens is shorter than an interval between said plane-convex lens group and the irradiated portion; and a light receiving device for receiving light from the portion of the object irradiated with the split ray bundle which has been transmitted through said lens system, and for producing a doppler signal that includes information related to velocity of the irradiated portion of the object.

20. A doppler velocimeter apparatus according to claim 19, wherein said ray bundle splitter device comprises a diffraction grating.

21. A doppler velocimeter apparatus according to claim 19, wherein the wavelength of the bundle of rays produced by said light source varies and said ray bundle splitter device and said lens system are arranged to prevent changes in the doppler signals produced by said receiving device otherwise caused by fluctuation of the light wavelength.

22. A displacement information detecting apparatus comprising:

a light source for producing light;

a ray bundle splitter device for splitting light received from said light source into a split ray bundle;

a first lens system and a second lens system for transmitting a split ray bundle from said ray bundle splitter device to irradiate a portion of a movable object to be examined, said first lens system and said second lens system having the same focal length F and being spaced apart from each other along an optical axis of said lens systems by an interval twice the focal length F, and being arranged so that an interval between said ray bundle splitter device and said first lens system is different from an interval between said second lens system and the irradiated portion, and so that spherical aberration caused by a portion of said first lens through which the split ray bundle from said ray bundle splitter device travels is offset by spherical aberration caused by a portion of said second lens system through which the split ray bundle from said first lens system travels; and a light receiving device for receiving light from the portion of the object irradiated with the split ray bundle which has been transmitted through said first lens system and said second lens system, and for producing information related to displacement of the irradiated portion of the object.

23. A displacement information detecting apparatus according to claim 22, wherein said ray bundle splitter device comprises a diffraction grating.

24. A displacement information detecting apparatus according to claim 22, wherein the wavelength of the light from said light source varies and said ray bundle splitter device and said lens system are arranged to prevent changes in the displacement information produced by said light receiving device otherwise caused by fluctuation of the light wavelength.

25. A displacement information detecting apparatus comprising:

a light source for producing light;

a ray bundle splitter device for splitting light received from said light source into a split ray bundle in a direction which changes depending on the wavelength of the light from said light source;

a first lens system and a second lens system for transmitting the split ray bundle from said ray bundle splitter device to irradiate a portion of a movable object to be examined, said first lens system and said second lens system having the same focal length F and being spaced apart from each other along an optical axis of said lens systems by an interval twice the focal length F, and being arranged so that an interval between said ray bundle! splitter device and said first lens system is different from an interval between said second lens system and the irradiated portion, and so that spherical aberration caused by a portion of said first lens through which the split ray bundle from said ray bundle splitter device travels and spherical aberration caused by a portion of said second lens system through which the split ray bundle from said first lens system travels remains unchanged despite wavelength fluctuation in the light from said light source; and a light receiving device for receiving light from the portion of the object irradiated with the split ray bundle which has been transmitted through said first lens system and said second lens system, and for producing information related to displacement of the irradiated portion of the object.

26. A displacement information detecting apparatus comprising:

a light source for producing light;

a beam splitting device for splitting light received from said light source;

a lens system for transmitting the split light from said beam splitting device to irradiate a portion of a movable object to be examined, said lens system comprising (i) a biconvex lens and (ii) a plane-convex lens group including two plane-convex lenses having respective convex surfaces which face each other, wherein said biconvex lens and said plane-convex lens group are spaced apart along an optical axis of said lens system by a first interval equal to a sum of focal lengths of said biconvex lens and said plane-convex lens group, and wherein a second interval between said beam splitting device and said biconvex lens is shorter than the focal length of said biconvex lens; and a light receiving device for receiving light from the portion of the object irradiated with the split light which has been transmitted through said lens system, and for producing information related to relative displacement of said irradiated portion of said object.

27. An apparatus according to claim 26, wherein said lens system transmits two split light beams from said splitting device to irradiate said portion of said object, wherein an interference fringe is generated on said irradiated portion.

28. A displacement information detecting apparatus comprising:

a light source for producing light;

a beam splitting device for splitting light received from said light source;

a first lens system and a second lens system for transmitting the split light from said beam splitting device to irradiate a portion of a movable object to be examined, wherein said first and second lens systems are spaced apart along an optical axis of said lens systems by a first interval equal to a sum of focal lengths of said first and second lens systems, and wherein a second interval between said beam splitting device and said first lens system is different from the focal length of said first lens system, whereby spherical aberration caused by a portion of said first lens system through which the split light from said beam splitting device travels is substantially offset by spherical aberration caused by a portion of said second lens system through which the split light from said first lens system travels; and a light receiving device for receiving light from the portion of the object irradiated with the split light which has been transmitted through said first and second lens systems, and for producing information related to relative displacement of said irradiated portion of said object.

29. An apparatus according to claim 28, wherein said second interval is shorter than the focal length of said first lens system.

30. An apparatus according to claim 28, wherein said lens systems transmit two split light beams from said beam splitting device to irradiate said portion of said object, and wherein an interference fringe is generated on said irradiated portion.

* * * * *

UNITED STATES PATENT AND TRADEMARK OFFICE
CERTIFICATE OF CORRECTION

PATENT NO. : 5,483,332  Page 1 of 2
DATED : January 9, 1996
INVENTOR(S) : Takamiya et al.

It is certified that error appears in the above-indentified patent and that said Letters Patent is hereby corrected as shown below:

COLUMN 1:

Line 33, "9." should read --$\theta$.--.

COLUMN 2:

Line 32, "light:" should read --light--; and
Line 42, "in" should read --$\pm$n--.

COLUMN 3:

Line 31, "!" should be deleted.

COLUMN 4:

Line 46, "p = $\lambda$k/2sin($\theta_0+\theta'$)" should read
--p = $\lambda$/2sin($\theta_0+\theta'$)--.

COLUMN 5:

Line 12, "system" should read --systems--; and
Line 32, "of which facing" should read --which face--.

COLUMN 7:

Line 19, "grating," should read --grating.--; and
Line 27, "light," should read --light.--.

UNITED STATES PATENT AND TRADEMARK OFFICE
CERTIFICATE OF CORRECTION

PATENT NO. : 5,483,332

DATED : January 9, 1996

INVENTOR(S) : Takamiya et al.

It is certified that error appears in the above-indentified patent and that said Letters Patent is hereby corrected as shown below:

COLUMN 10:

Line 33, "receiving: device" should read --receiving device--.

COLUMN 11:

Line 10, "leas" should read --lens--.

COLUMN 13:

Line 37, "bundle!" should read --bundle--.

Signed and Sealed this

Twenty-first Day of May, 1996

Attest:

BRUCE LEHMAN

Attesting Officer        Commissioner of Patents and Trademarks